(12) United States Patent
Brunheroto et al.

(10) Patent No.: US 6,993,081 B1
(45) Date of Patent: Jan. 31, 2006

(54) SEAMLESS SPLICING/SPOT-INSERTION FOR MPEG-2 DIGITAL VIDEO/AUDIO STREAM

(75) Inventors: Jose R. Brunheroto, Hawthorne, NY (US); Frans Laemen, Ossining, NY (US); Julio Nogima, White Plains, NY (US); Frank A. Schaffa, Hartsdale, NY (US); William J. Anzick, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,335

(22) Filed: Nov. 23, 1999

(51) Int. Cl.
*H04N 7/12* (2006.01)

(52) U.S. Cl. .................................. 375/240.28; 370/487
(58) Field of Classification Search ............ 375/240.12, 375/240.28, 240.24, 240, 240.01; 348/385.1, 348/700, 709, 699, 388.1, 419.1, 423.1, 425.1, 348/512; 370/487, 498
See application file for complete search history.

(56) References Cited

U.S. PATENT DOCUMENTS

| 5,534,944 | A | | 7/1996 | Egawa et al. |
| 5,859,660 | A | | 1/1999 | Perkins et al. |
| 5,917,830 | A | * | 6/1999 | Chen et al. .................. 370/487 |
| 5,982,436 | A | * | 11/1999 | Balakrishnan et al. ....... 348/700 |
| 6,049,569 | A | * | 4/2000 | Radha et al. ................ 348/705 |
| 6,137,834 | A | * | 10/2000 | Wine et al. .................. 375/240 |
| 6,154,496 | A | * | 11/2000 | Radha .................... 375/240.28 |
| 6,208,691 | B1 | * | 3/2001 | Balakrishnan et al. ....... 348/700 |
| 6,269,120 | B1 | * | 7/2001 | Boice et al. ........... 375/240.12 |

* cited by examiner

*Primary Examiner*—Gims Philippe
(74) *Attorney, Agent, or Firm*—Scully, Scott, Murphy & Presser; Douglas W. Cameron, Esq.

(57) ABSTRACT

A system and method for a seamless splicing/spot insertion strategy for MPEG-2 digital video/audio transport stream with no previously encoded information. This strategy, considering the time dependency between MPEG-2 frames, results in a new stream with smooth transition from a main stream to a spot stream without any encoded mark increasing possibilities for utilization of MPEG-2 contents. This strategy further facilitates local and remote switching (like local advertisement insertion) and produces successful decoding and presentation of all MPEG-2 packets around the splicing point. It takes into account several kinds of MPEG-2 related discontinuities: transport header continuity counter gaps, temporal reference discontinuity for frame presentation and PCR/PTS/DTS discontinuities.

7 Claims, 5 Drawing Sheets

SEAMLESS SPLICING/SPOT-INSERTION FOR MPEG-2 DIGITAL VIDEO/AUDIO STREAM

BACKGROUND OF THE INVENTION

1. Field of the Invention

This present invention relates generally to systems for processing MPEG-2 digital video streams/data, and particularly, to a system for splicing and spot insertion in MPEG-2 video streams.

2. Discussion of the Prior Art

The MPEG-2 standards cover three parts: systems, video and audio. Systems are defined by the recommendation ITU-T Rec. H.222.0 ISO/IEC 13818-1: Information technology—Generic coding of moving pictures and associated audio—Systems. The recommendation for video is the ITU-T Rec. H.262 ISO/IEC 13818-2: Information technology—Generic coding of moving pictures and associated audio—Video. The audio portion is covered by the recommendation ISO/IEC 13818-3: Information technology—Generic coding of moving pictures and associated audio—Audio.

An MPEG-2 stream usually contains three types of video frames: I-frame (intra-coded frame) which is coded using information only from itself, P-frame (predictive-coded frame) which is coded using motion compensated prediction from the past reference frame-like previous I or P frame—and B-frame (bidirectionally predictive-coded frame) which is coded using motion compensated prediction from other past and/or future reference frames—like other I-frames and/or P-frames. A video sequence comprises a sequence of frames arranged in Group of Pictures (GOP). A GOP header is an optional header that can be present immediately before an I-frame to indicate to the decoder if the first consecutive B-frame can be decoded without any other past reference but the last I-frame.

MPEG-2 digital technology is very important for TV broadcasters since it allows for the transmission of more programs per channel than the current analog systems by means of digital compression. It also facilitates the introduction of new services. However, it is required that this new technology support all capabilities of the current system. Current analog CATV systems allow for local advertisement insertion on live broadcast feeds. This kind of capability is not trivial to implement in video streams that are in the compressed domain. The insertion/overlay of a second video stream (e.g., local advertisement) into a first video stream (e.g., live broadcast feed) cannot be done at any random point. The penalty will be the presentation of some artifacts at the viewer side if certain requirements are not met.

Splicing refers to the concatenation performed on two different elementary streams, resulting in a third elementary stream which is also compliant with the MPEG recommendations. The MPEG-2 standard defines some provisions to support splicing. For example, it provides guidelines for determining locations in the stream where there are opportunities to splice, that is, it defines some splice points. However, specifications of the splice points alone is not enough to guarantee a clean splicing (without artifacts) because there is a risk of decoder buffer overflow in the time interval during which bits of both streams are in the buffer. Furthermore, this extra information has to be inserted into the streams during the encoding process.

How often these splice points should occur in a stream is not specified by the standards, which can be a problem in applications where the switch from the first stream to the second stream has to be performed within a certain time and cannot wait until the next splice point occurs. Furthermore, switching from one MPEG-2 stream to another should take into account all the different I, B, P-frame motion vectors and GOPs as well as several kinds of discontinuities: transport header continuity counter discontinuity, temporal reference discontinuity for frame presentation, PCR/PTS/DTS timestamp discontinuity, etc.

Thus, what is needed is a system capable of performing splicing in MPEG-2 data streams that does not necessarily provide any information on splice points, and particularly, one that may determine the splice points by itself and guarantee that the transition from the first to the second video stream will be made with no visual artifacts.

Prior art attempts addressing the splice/spot insertion problem in MPEG-2 data streams may be found in U.S. Pat. No. 5,534,944 which proposes a method of splicing that inserts stuffing information between the last picture of the first stream and the first picture of the second stream. By doing so, it is claimed that there will be no overflow of the decoder buffer when the resulting video stream is received. However, this method does not define how to find the splice points in these streams. It does not take into consideration that a video sequence consists of group of pictures and the switching from one stream to the other cannot be done at any random picture boundary. Further, the method described in U.S. Pat. No. 5,534,944 requires an emulation of the decoder buffer to gather the information needed to calculate the amount of stuffing to be inserted. They do not cover splicing on transport streams where other elementary streams besides video (e.g., audio) can be present and have also to be spliced accordingly (synchronized).

Another proposed solution to the problem is found in U.S. Pat. No. 5,859,660 which describes a method based in insertion of null information between the two streams at the splicing point. The referred solution, however, requires an insertion of a black frame at the splicing point, either by the encoder or by the splicing device, to minimize the visual effects of the transition. Additionally, this prior art method also causes the decoder buffer to be emptied before inserting the second stream which generates a considerable delay between the presentation of the last frame of the first stream and the first frame of the second stream. Further, this method does not address timestamp (PCR, PTS, and DTS) and continuity counter discontinuities occurring at the splicing point.

SUMMARY OF THE INVENTION

It is an object of the invention to provide a system and method for performing splicing/spot insertion in MPEG-2 data streams without prior knowledge of splice points.

It is another object of the invention to provide a system and method for performing splicing/spot insertion in MPEG-2 data streams that determines the splice points and guarantees that the transition from a first to a second video stream is made with no visual artifacts.

It is a further object of the invention to provide a system and method for performing splicing/spot insertion in MPEG-2 data streams that determines the splice points while ensuring no timestamp (PCR, PTS, and DTS) and continuity_counter discontinuities exist for the streams after spot insertion at the splicing point.

According to the invention, there is provided a system and method for splicing two MPEG encoded digital video streams to provide a single decodable video stream for transport at an MPEG transport level, the decodable video stream comprising video frames for temporary storage at a receiver decoder buffer. The method includes the steps of: determining a splice outpoint of a first stream and a splice inpoint of a second stream to establish a splice point for both streams. For each first stream and second stream, a decoder_buffer_delay is calculated which is characterized as the time period between a first byte of the video frame entering into the decoder buffer until it is removed from the buffer; the first stream including an associated first decoder_buffer_delay and the second stream having an associated second decoder_buffer_delay. The first stream is transmitted up to the determined splice outpoint onto an output transport stream, and the first decoder_buffer_delay and second_buffer_delay are compared to calculate a buffer delay difference. This difference is utilized for adjusting the decode buffer occupancy level prior to transmitting the second stream onto the output transport stream which starts from the determined inpoint.

Advantageously, the seamless splicing/spot insertion system and method of the invention further may be done around any I or P-frame within a main stream in order to switch to any GOP within a spot stream while taking into account all different MPEG-2 frames and compensating for timestamp and continuity_counter discontinuities.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Considering the dependency between MPEG-2 frames, a good splicing/spot insertion strategy should result in a new stream with smooth transition from the main stream (the currently running one) to the spot stream (the one to be inserted). In other words, it requires successful decoding and presentation of all frames around the splicing point.

Figure 1:
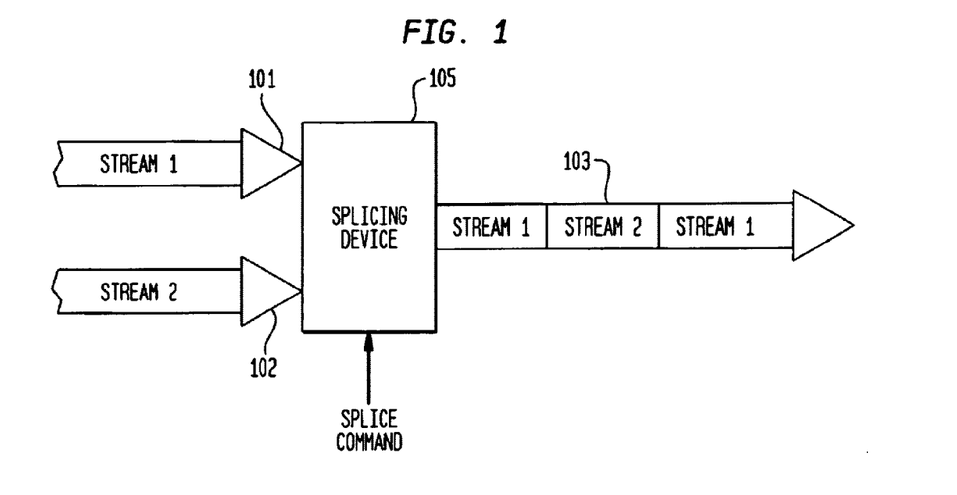
FIG. 1 illustrates an example of a generic digital stream splicing device in accordance with the present invention.

FIG. 1 depicts the function of a generalized MPEG-2 stream splicing system (105) according to the invention which basically receives two different input streams (101), (102) and produces a third output stream (103) which is a concatenation of the two input streams. A more detailed block diagram illustrating the components of the seamless splicing/spot-insertion system of the present invention is shown and described herein with respect to FIG. 6.

Figure 2:
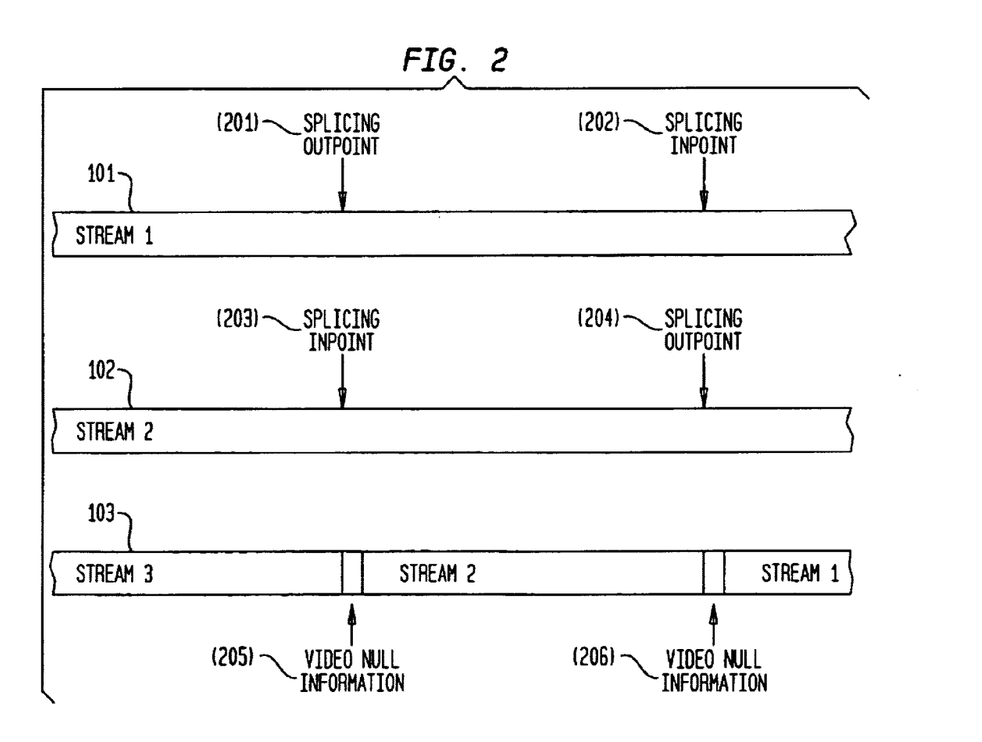
FIG. 2 illustrates the concept of splicing of two digital streams.

FIG. 2 illustrates an example mechanism for splicing the two streams (101), (102) as carried out by the splicing/spot-insertion system. In this example, the Stream 2 (102) is inserted into the Stream 1 (101) for a period of time. For example, Stream 2 may be an advertisement (hereinafter "ad") to be inserted into a broadcast feed (Stream 1). A splicing outpoint (201) (for Stream 1) and (204) (for Stream 2) is defined as a point of exit from one stream, and a splicing inpoint (202) (for stream 1) and (203)(for Stream 2) is defined as a point of entry into another stream. Video null information (205), (206) is inserted between the two streams at the splicing point as part of the adjustment according to the present invention.

According to the invention, one of the most important considerations is the matching that is done for the time delay between the time period starting from the reception of the first byte of the frame at the decoder buffer to the moment when the frame is removed from the decoder buffer. This delay indicates the occupancy level of the decoder buffer (hereinafter, decoder_buffer_occupancy) before frame removal. For constant bit rate, the decoder buffer is filled at constant rate while the decoder occupancy drops at frame removals. It is essential to keep the decoder buffer occupancy between zero level and a maximum limit specified within the stream in order to avoid underflow and overflow. As will be described herein, the splicing mechanism of the invention maintains the buffer occupancy of the decoder at the same level it is supposed to be if the main stream and inserted stream were transmitted separately into the decoder, with the exception of the time period when data of both streams are present in the decoder buffer. For example, in order to match the difference of the buffer occupancy of the main and spot streams at the splicing point, video null information is inserted and the PTS/DTS is adjusted in the inserted stream.

Figure 3:
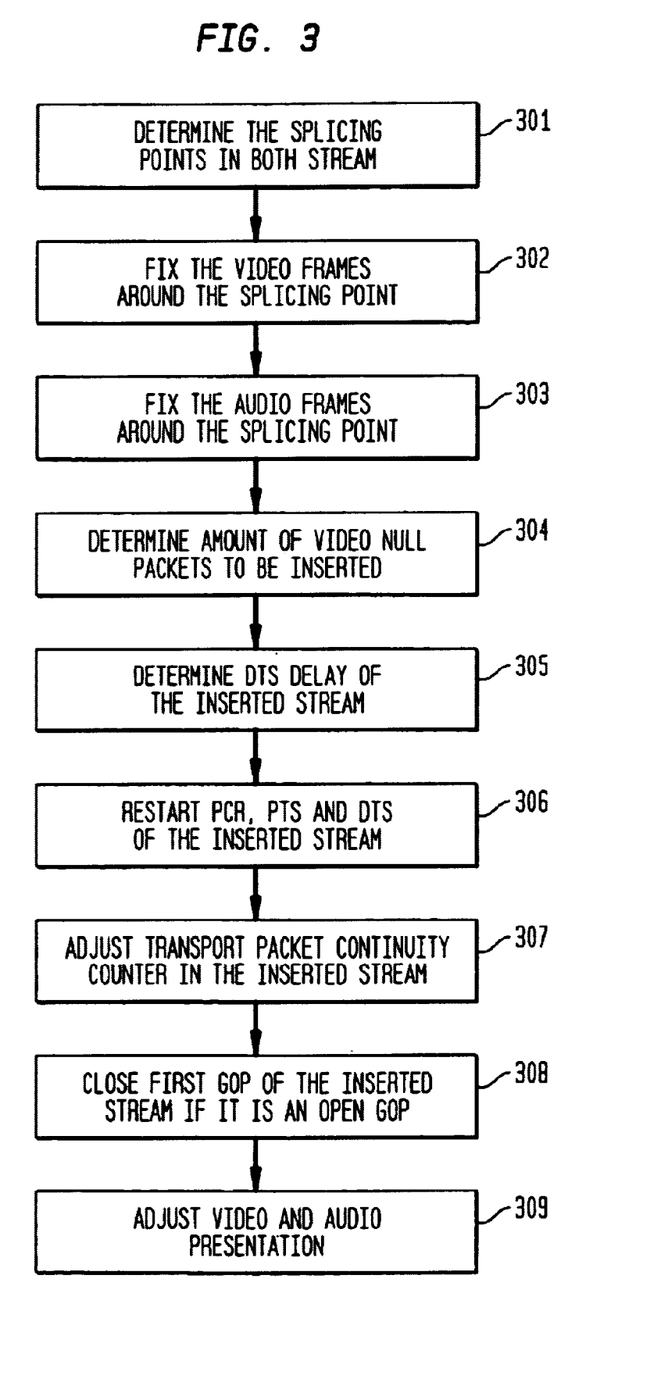
FIG. 3 is a flowchart describing method steps invoked in the implementation of a splicing device according to the present invention.

FIG. 3 is a flowchart depicting the splicing algorithm according to the invention:

At step 301, the splicing points (the splicing outpoint of the first stream (e.g., Stream 101) and the splicing inpoint of the second stream) are determined. As known, the splicing point must be at a frame boundary, i.e., there can not be a splice at the middle of the frame. Moreover, there cannot be a splice point at any random frame, e.g., splicing at a B-frame and inserting a B-frame of the second inserted stream will almost certainly result in visual artifacts. Therefore, for the splice outpoint (stream 1 ending), the frame ending must be either an I or P-frame (in presentation order). For the stream to be inserted, the splice inpoint is always associated to an I-frame. Preferably, a search mechanism is employed that searches both streams, locates the appropriate frames for both streams, and determines the splice inpoint and outpoints complying with the mentioned criteria. A search mechanism employed may comprise a real-time search pattern mechanism such as shown and described in commonly-owned, co-pending U.S. patent application Ser. No. 09/447,633 entitled A METHOD AND APPARATUS FOR SEARCHING PATTERNS IN REAL-TIME OVER A SHARED MEDIA, the whole contents and disclosure of which is incorporated by reference as if fully set forth herein.

At step 302, the video packets of both streams are fixed around the splicing point in order to guarantee the integrity of the video elementary stream. The last packet of the ending stream is fixed to guarantee that it ends at a video frame boundary. Similarly, the first packet of the inserted stream is fixed to ensure that it begins at a frame boundary. An end of sequence start code is added at the splicing outpoint if not already present in the main stream. If not present, a sequence header is additionally inserted at the splicing inpoint. The PES length of the last PES packet of the main stream and the PES length of the first PES packet of the spot stream are also fixed to reflect the fixed streams.

Then, at step 303, the audio packets of both streams are adjusted at the splicing points. As the splicing point has been determined based only on the video portion of the program, it is possible that at the determined splice point, the corresponding audio information may show a cut in the middle of an audio frame. However, it is necessary that the audio portion ends at a whole entire frame for the audio decoder to decode the audio information correctly. Thus, in step 302, a search is made for both program streams around the splicing point and any partial audio frame present at the splice point is removed, thus adjusting the audio frame for the first stream and the inserted stream so that the audio portion of the first stream ends on a whole frame, and the audio portion of the inserted stream begins with a whole frame.

In step 304, the amount of video null information, in the form of MPEG transport packets to be inserted between the two streams at the splicing point, is calculated. This video null information is used as empty data to consume time. During the period these video null packets are sent to the decoder, the buffer occupancy does not increase because there is no video data information. At specified decoding timestamps, frames are removed from the buffer thus, decreasing the buffer level. The amount of video null information calculated is a function of the decoder_buffer_delay characterized as the difference in decoder buffer occupancy levels of video frames for the first (main) and second (inserted) streams at the splicing point.

Figure 4:
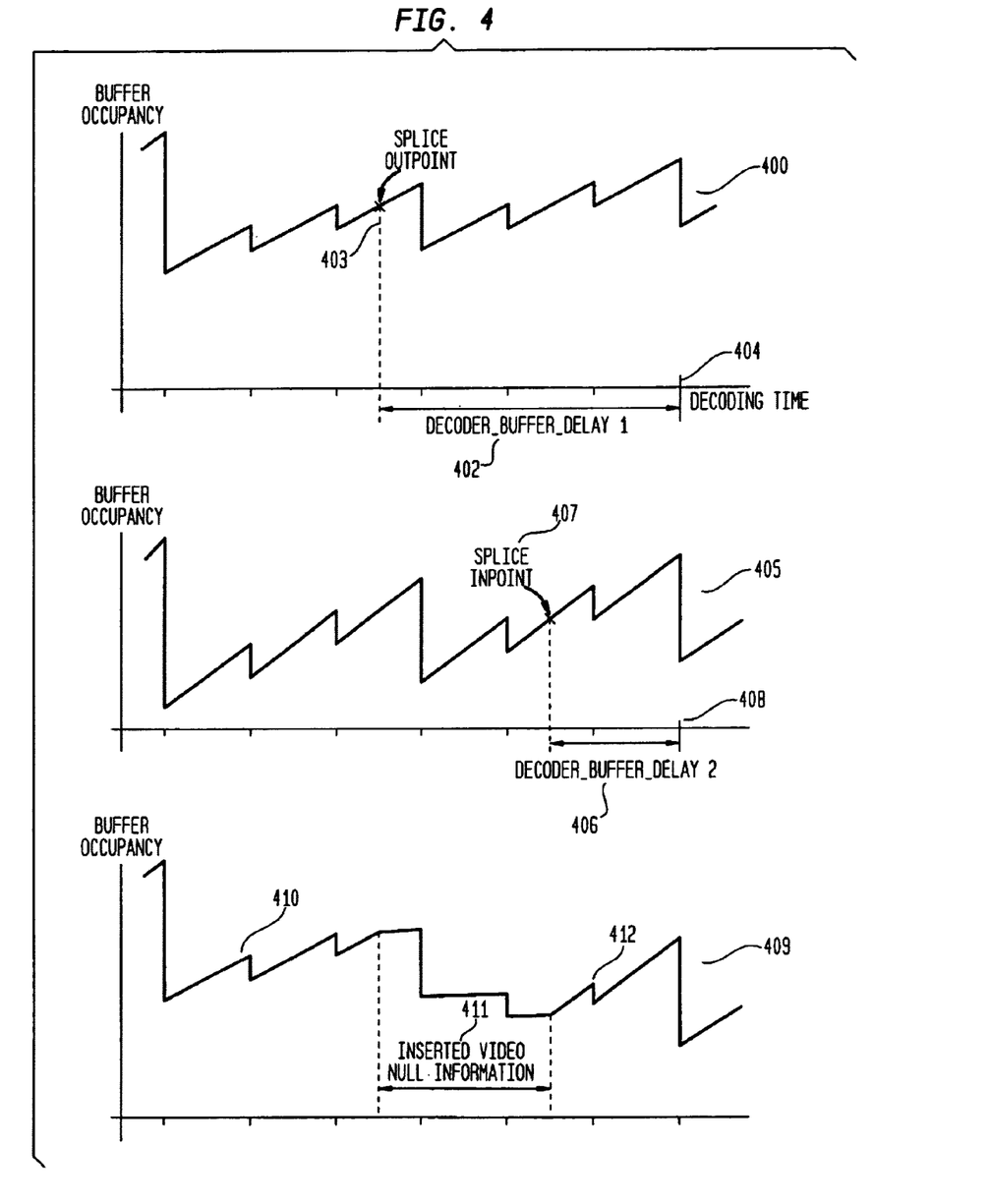
FIG. 4 depicts an example buffer occupancy of two streams to be spliced and the buffer occupancy of the resultant stream after the splice, whereby the buffer occupancy has to be decreased for the new stream.

FIG. 4 illustrates how the amount of video null information is calculated. In FIG. 4, the first stream (main stream) to receive the spot insertion is depicted as stream 401; the second stream (spot stream) is depicted as stream 405; and, the resulting stream after the splice process is depicted as stream 409. The decoder_buffer_delay 1 402 of the first stream 401 is defined as the difference between the decoding timestamp (DTS) 404 and the time of arrival of the first byte 403 of the first picture after the splicing point. Note that any picture in the first stream after the splicing point is not sent to the decoder. The decoder_buffer_delay 2 406 of the second stream 405 is defined as the difference between the decoding timestamp 408 and the time of arrival of the first byte 407 of the first picture after the splicing point. This picture is the first picture of the second stream to be sent to the decoder. The decoder_buffer_delay is directly associated with the buffer occupancy since it determines how long a frame is kept in the buffer before its removal. The longer it remains in the buffer, more other frames are received and the buffer level increases. According to the invention, however, if the decoder_buffer_delay of the spot stream in the result stream is kept the same as in the original stream, the buffer occupancy characteristics also remain the same as the original. In order to match the two decoder_buffer_delays at the splicing point, video null information is inserted. The amount of time during which video null information is transmitted is a function of decoder_buffer_delay 1–decoder_buffer_delay 2. Particularly the following relation governs the amount of video null information that needs to be inserted $$video\_null\_pkt = (decoder\_buffer\_delay\ 1 - decoder\_buffer\_delay\ 2) / periodicity\_of\_transport\ packet$$

where the periodicity_of_transport packet is a value determined by the packet size and the bit rate of the transport of the stream to be inserted. It should be understood that in the determination of the decoder_buffer_delay 1 there is included the step of determining whether there is another frame after the last video frame to be presented, as would be indicated by the presence or not of an end of sequence start code at the end of the stream (before the splice point). This is necessary because the splicing algorithm according to this invention assumes the presence of an additional frame after the last one to be presented. If there is no additional frame, then the invention emulates this last frame by finding the time period between the end of sequence start code of the main stream until the removal time of the last frame to be presented, and then adding one frame period to this calculated time interval. The resulting time interval is defined as decoder_buffer_delay 1. If there is no end of sequence start code present, then an end of sequence start code is inserted after the last frame to be transmitted and a time period is determined between the last byte transmitted (which is the last byte of the inserted end of sequence start code) until the removal of the last frame as determined by the DTS. Then, one frame period is added to this calculated interval, and the result is defined as decoder_buffer_delay 1.

The result stream (409) shows three parts: the last portion of the first stream (410), the inserted video null information (411) and the first portion of the second stream (412). As will be explained, this step additionally includes replacement of information, i.e., restamping of PCR, PTS and DTS of the inserted stream. The inserted video null packets are transmitted at the bit rate of the second stream.

Figure 5:
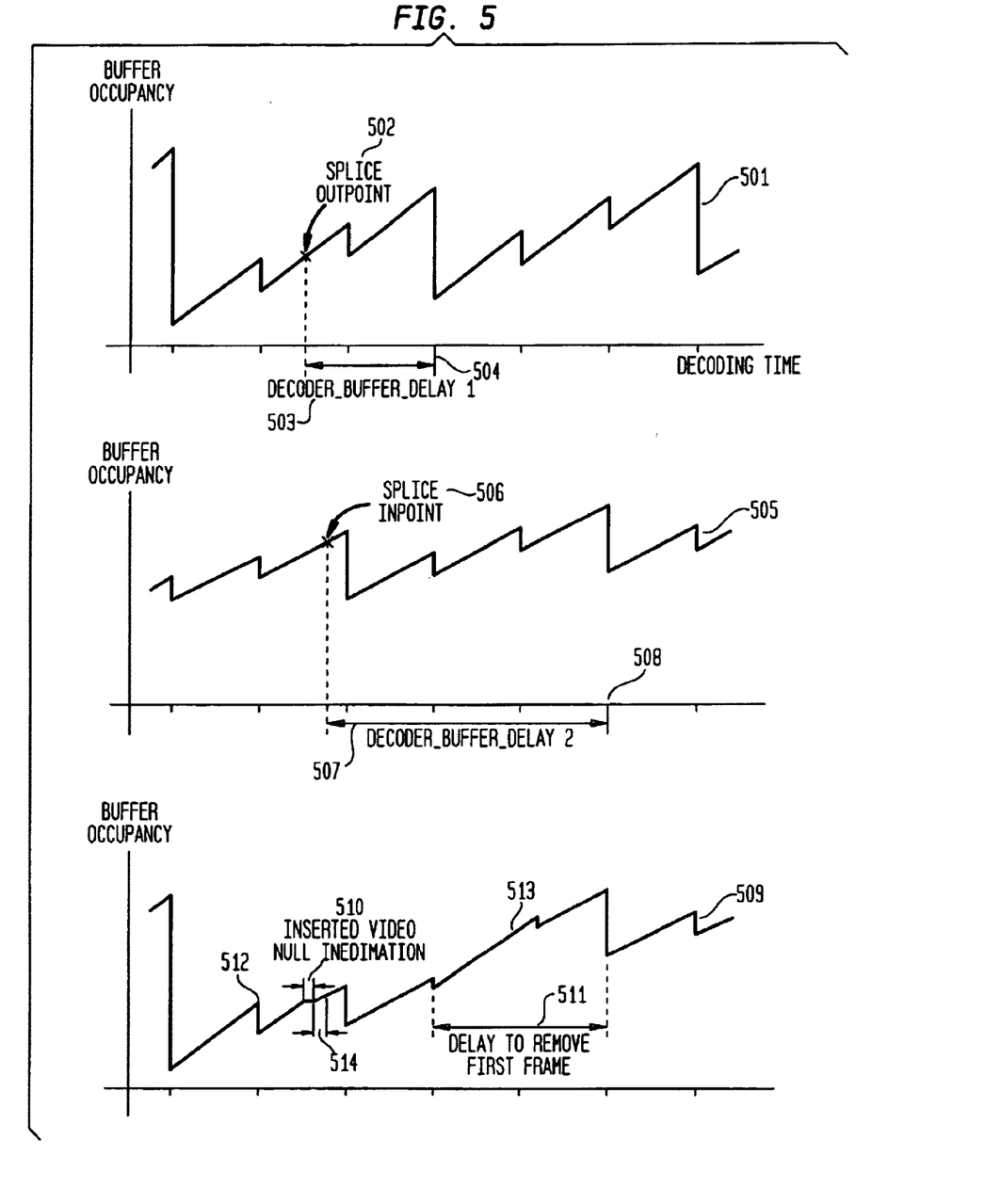
FIG. 5 depicts an example buffer occupancy of two streams to be spliced and the buffer occupancy of the resultant stream after the splice, whereby the buffer occupancy has to be increased for the new stream.

FIG. 5 illustrates this situation where the decoder_buffer_delay 1 is smaller than decoder_buffer_delay 2 (of FIG. 4). In FIG. 5, the first stream (main stream) to receive the spot insertion is depicted as stream (501); the second stream (spot stream) is depicted as stream (505); and, the resultant stream after the splice is depicted as stream (509). As shown in the FIG. 5, decoder_buffer_delay 1 (503) of the first stream (501) is smaller than the decoder_buffer_delay 2 (507). This means that more time has to be allowed before removing the first frame of the inserted stream which requires the addition of replacement frames for delaying the decoding of the second stream. According to the invention, the removal of the first frame is a function of the difference decoder_buffer_delay 2–decoder_buffer_delay 1. However, this difference may not be an integer number of frame periods. In order to maintain a uniform periodicity of the removals, video null information also needs to be inserted. That is, replacement frames are inserted along with video null information (510) to avoid discontinuity in the frame removals. These frames are either B or P types of frames that are very short with minimum video information and comprise a reference to the last presented picture of the first stream. The visual effect of these frames is to force the decoder to repeat the last presented frame. They are inserted as part of the last GOP of the first stream and the temporal reference of these frames are adjusted accordingly to reflect it. The inserted P and B frames follow the same structure of P and B frames of the last GOP, that is, the number of B-frames between two P-frames is kept the same. The number of replacement frames to be inserted is given by N. The amount of delay and (video null information) to be inserted is governed by:

$$video\_null\_info\_time = ((N^*frame\_period) - (decoder\_buffer\_delay\ 2 - decoder\_buffer\_delay\ 1))$$

where: N is the smallest integer that makes the result of the equation positive; and, video_Null_info_time represents the amount of time during which video null information (510) is to be inserted. N determines the quantity of delay (511) to be inserted in number of frame periods, i.e., it represents the whole number of replacement frames to be inserted. In FIG. 5, the result stream (509) is shown as comprising three parts: the last portion of the first stream (512), the inserted video null information (510), the inserted replacement frames (514) and the first portion of the second stream (513).

Thus, in the situation where the buffer occupancy level (accumulated frames) of the inserted stream (Stream 2) is greater than that of the stream (Stream 1) extra frames must be inserted in order to delay the decoding of the second (inserted) stream. The determination of how many extra frames to insert at the end of the first stream before transmission of the second stream is referred to as the DTS (Decoding Time Stamp) delay determination and performed at step 305, FIG. 3.

Referring now to FIG. 3, at step 306, the Program Clock Reference (PCR), Presentation Time Stamp (PTS) and Decoding Time Stamp (DTS) timestamps of the resultant stream are recalculated in order to guarantee proper continuity of these parameters. Restamping is necessary because when there is a switch from stream 1 to the second inserted stream 2, for example, the PCR on the stream 1 may be a first value, e.g., 100, but for the inserted stream 2, may be a different value, e.g., 0. In order to avoid a PCR jump, a PCR delta is calculated at the splicing point, and the information is used to recalculate the PCR clock time, e.g., for the second stream. The PTS and DTS of the inserted stream 2 are also recalculated in a similar way. These adjusted values may be determined from information obtained by the searching engine as described in above-referenced U.S. patent application Ser. No. 09/447,633.

According to the invention, the program ID (PID) of the transport stream packets of the second stream are remapped to the PD of the first stream as may be performed in the manner as described in owned, co-pending U.S. patent application Ser. No. 09/447,632 entitled A METHOD AND APPARATUS FOR MPEG-2 PROGRAM ID REMAPPING FOR MULTIPLEXING SEVERAL PROGRAMS INTO A SINGLE TRANSPORT STREAM, the whole contents and disclosure of which is incorporated by reference as if fully set fort herein Further, as described in U.S. patent application Ser. No. 09/447,632 the continuity_counter of the second stream is additionally adjusted to guarantee proper program continuity. Thus, as indicated at step 307, the continuity_count of the transport packets in the inserted stream is corrected in order to prevent a continuity_counter discontinuity. That is, for every unique packet belonging to a program source, a value is incremented in the counter, so in the event that something happens on the transport stream, e.g., a packet is lost or missed, this error can be detected. This ensures that the continuity counter of the first packet on the second stream contains the proper value to prevent a false error detection when switching from the first stream to the second stream.

Next, as indicated at step 308, there is performed the decoding step and presentation aspect of the first Group of Pictures (GOP) comprising a sequence of I-, P-, and B-frames of the inserted stream. More specifically, this step is related to the first B frames that follow the I-frame in the GOP. If the GOP is a closed GOP, there is no problem presenting these frames because all the reference pictures to present these B-frames are present. However, if this GOP is an open GOP, the past reference of these pictures will not be present in the stream anymore. By determining content information about the stream itself, e.g., GOP header information, the present invention determines whether the GOP is open. In the case of an open GOP, information required for correct frame decoding is unavailable. Thus, when splicing, if the GOP is an open GOP (second stream) it is required to be closed. The present invention determines that if the GOP is open, the B-frames are replaced by replacement B-frames with backward prediction only (with reference to the first I-frame of the GOP). The temporal reference information of the pictures of this first GOP is also corrected to reflect the proper presentation sequencing of the pictures.

It should be understood that, in a program stream, the synchronization between the video elementary stream and audio elementary stream (or streams) is accomplished through the Presentation Time Stamps (PTS) present in both elementary streams. However, it is not mandatory that the video information and the corresponding audio information be transmitted at the same time in the stream. As a result, these two elementary streams are not necessarily synchronized at the transmission point. The decoder extracts the audio frames and the video frames from the received stream and stores them in different buffers. The synchronization is achieved when the audio and video frames are removed from the respective buffers which is determined by the PTS of each of the elementary streams. Therefore, there are no guarantees that the audio and video of the inserted stream will be synchronized after the splice.

Thus, the methodology of the invention avoids the situation that audio information and video information of the different streams (stream 1 and stream 2) be presented together. In addition, the present invention guarantees that the audio buffer will not be empty before the inserted stream enters the decoder buffer, so as to avoid a condition that may lead to an improper audio decoder operation.

Thus, as shown in FIG. 3, step 309, an adjustment of the audio and video presentation is made that includes the following steps: the PTS associated with the first audio frame of the stream 2 is compared to the PTS of the first video frame of the stream 2. If the audio PTS is smaller than the video PTS, i.e., there is audio information with no associated video at the beginning of the stream, all audio frames with PTS smaller than the video PTS are replaced with audio frames that generates silence. Similarly, the PTS of the last audio frame of the stream 1 is compared to the PTS of the last video frame of stream 1. If the audio PTS is greater than the video PTS, all audio frames with PTS greater than the video PTS are replaced with audio frames that generates silence.

More particularly, at the end of the stream 1, some video null information is transmitted according to the proposed method as described herein, before transmitting the stream 2. During the time this video null information is being received by the decoder no new audio frames are received into the decoder buffer. However, audio frames already present in the buffer are being removed at the time determined by their associated PTS. If the period of video null information is long enough, all the audio frames present in the decoder may be removed and therefore the audio buffer will be empty. In order to prevent this, the present invention enables audio frames to be transmitted as part of the video null information. These inserted audio frames have the characteristics (sampling rate, bit rate, etc) of the stream 2 and the content of these audio frames is such that they will cause the audio decoder to present silence after decoding them. The periodicity of these inserted audio frames is determined by the sampling frequency and the number of audio samples present in a frame.

Figure 6:
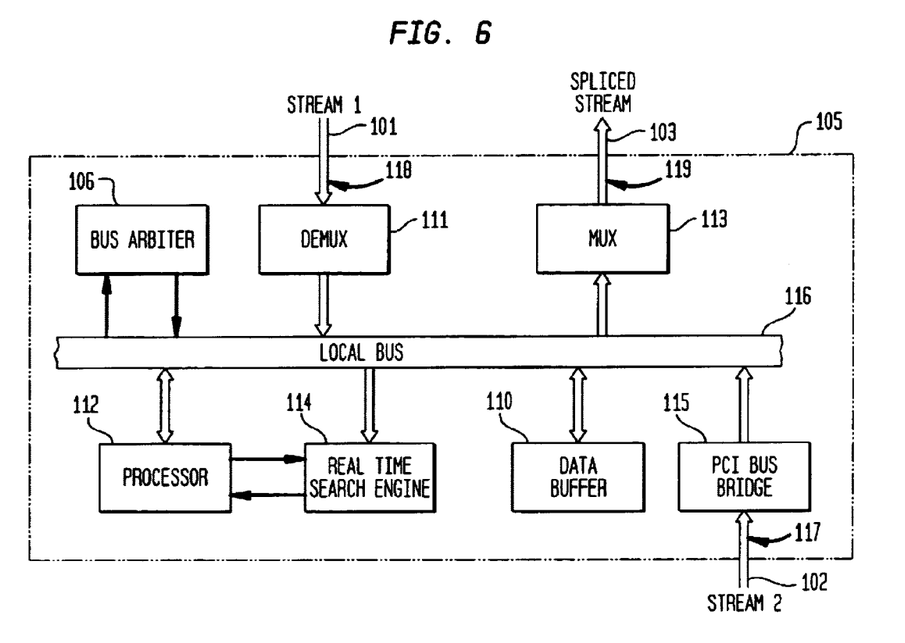
FIG. 6 is a block diagram illustrating the components of the seamless splicing/spot-insertion system of the present invention.

FIG. 6 is a block diagram illustrating a preferred implementation of the seamless splicing/spot-insertion system 105 of the present invention. As shown in FIG. 6 there is provided the following primary components: an input port 118 for receiving MPEG Transport Streams, e.g., stream 1 101, and inputting steams into an MPEG Demultiplexer (MPEG Demux) 111 block where it de-muldiplexes the individual program streams for temporary storage in a local Packet Memory storage device 110. The MGEG Transport stream Demux operation is preferably implemented as shown and described in commonly-owned, co-pending U.S. patent application Ser. No. 09/448,333, the contents and disclosure of which is incorporated by reference as if fully set forth herein. Preferably, the Packet Memory 110 is used to cache both incoming and outgoing program streams.

More particularly, the real-time search and indexing engine 114 described in above-referenced co-pending U.S. patent application Ser. No. 09/447,633 and incorporated by reference herein, is provided that is MPEG-2 aware, and supports multiple program streams that are transferred over a non-multiplexed local bus 116, e.g., a 32-bit bus. The MPEG-2 program streams, such as shown in FIG. 6, may be originated from a network connection or from a local storage device (e.g., hard-disk) (not shown). In any case, its contents are transmitted in blocks (over the local bus 116) to be written into the Packet Memory 110. That is, a program stream that is received from the input port 118, via the MPEG Demux block 111, is processed and stored in the Packet Memory 110. A PCI Bridge 115 is provided for interconnecting the Local Bus 116, and its connected components, with the PCI Bus 117. Thus, a program stream to be inserted, e.g., stream 2 102, that is stored in a hard-disk (or is retrieved from any local storage device (not shown)) uses this path for storage in Packet Memory. The real-time search and indexing engine 114 monitors the data transfers into the Packet Memory device, i.e., the write operations. By doing so, it captures essential information about the PCR, PTS, DTS, and video frames in the streams to be used by the splicing algorithm according to this invention.

Additionally shown in FIG. 6 is the provision of an MPEG Multiplexer (MPEG Mux) device 113 that reads data from the individual program streams stored in Packet Memory 110 to generate the new spliced MPEG Transport Stream at Output Port 119. The MGEG Transport stream Mux operation is preferably implemented as shown and described in commonly-owned, co-pending U.S. patent application Ser. No. 09/448,334, the contents and disclosure of which is incorporated by reference as if fully set forth herein. As known to skilled artisans, the MPEG-2 standard specifies how programs (consisting of audio and video elementary streams) can be multiplexed together in a "multi-program transport stream". This is specified in the MPEG-2 Systems Specification, ISO/IEC 13818-1. All MPEG-2 transport stream packets, regardless of content, are of a fixed size (188 bytes) and format. "Program-Specific Information", which is also carried in the transport stream, carries the information regarding which elementary streams have been multiplexed in the transport stream, what type of content they carry, and how they may be demultiplexed.

Further shown in FIG. 6 is a Processor device 112 that manages and controls all the blocks connected to the Local Bus 116 and performs the method steps and calculations for seamless MPEG-2 splicing operations including calculations of both decode_buffer_delay for the first and second streams described herein. That is, the processor 112 attached to the local bus 116, controls the various system data flows which include: 1) data flow from the MPEG demux 111 to the Packet Memory; 2) flow from the PCI Bridge 115 to the Packet Memory; 3) flow of spliced transport streams from the Packet Memory to the MPEG Multiplexer 113; 4) flow from the Packet Memory to the PCI Bridge 115. All write operations into the packet memory are monitored by the Real-time Search Engine 114. The system additionally implements the following control flows: 5) control flow from the bus arbiter 106 to all modules connected to the Local Bus 116 for regulating access to the bus; and, 6) control flow from the Real-time Search Engine 114, reporting search results.

In the downstream direction (from MPEG-2 distribution head-end to client displays), a shared broadcast medium is used, such as the cable TV infrastructure and satellite link using DVB (Digital Video Broadcast) Interface (not shown). Known modulation methods may be used that include QAM (quadrature amplitude modulation) and VSB (vestigial side band) modulation. Integrated circuit (IC) Chipsets for the modulation and demodulation, as well as MPEG-2 video and audio encoders/decoders are widely available.

In the preferred embodiment of the invention, the element used to transmit and receive MPEG-2 streams is the Multiplexer Stream Controller Card (MSC Card). This MSC Card is an adapter that fits in the PCI bus and complies with PCI Specification Revision 2.1 and may utilize a PowerPC 403GCX RISC 32-bit Embedded Microcontroller (Processor 112) which implements a variation of the PowerPC architecture optimized for embedded control applications as set forth in the PPC403GCX Embedded Controller User's Manual reference the contents and disclosure of which is incorporated by reference as if fully set forth herein.

Particularly, the main function of the MSC Card is to: receive data from the digital input port (DVB_SPI—Synchronous Parallel Interface or DVB_ASI—Asynchronous Serial Interface) or from the PCI bus; store the received demultiplexed packets and additionally, the packets to be sent by the multiplexer; and, multiplex several video streams including spliced video streams to generate an MPEG-2 Multi-Program Transport Stream that is transmitted over the output port (DVB_SPI—Synchronous Parallel Interface or DVB_ASI—Asynchronous Serial Interface). The MSC Card Processor 112 particularly carries out the methodology for splicing/spot-insertion of the invention.

If not incorporated in the audio and video decoder, an intermediate IC may be necessary at the output of the decoders to convert from digital to analog and, in the case of video, encode to the desired video analog signal format (such as NTSC, PAL, or SECAM). S-video output from these IC's is optional. One MPEG-2 video decoder system is used in the preferred embodiment for display capability.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for splicing two MPEG encoded digital video streams to provide a single decodable video stream for transport at an MPEG transport level, said decodable video stream comprising video frames for temporary storage at a receiver decode buffer, the method comprising the steps of:
   a) determining a splice outpoint of a first stream and a splice inpoint of a second stream to establish a splice point for both streams;

b) for each said first stream and said second stream, calculating a decoder_buffer_delay characterized as a time period between the first byte of the video frame entering into the decoder buffer until it is removed from the buffer at a decoding time, said first stream having an associated first decoder_buffer_delay (decoder_buffer_delay 1) and said second stream having an associated second decoder_buffer_delay (decoder_buffer_delay 2), wherein said first decoder_buffer_delay is less than said second decoder_buffer_delay;

c) transmitting the first stream up to the determined splice outpoint onto an output transport stream;

d) comparing said first buffer delay and second buffer delay to generate a buffer delay difference and adjusting the decoder buffer occupancy level according to said buffer delay difference, said adjusting including inserting video null packets between said first and second streams at the splice point, to precisely compensate any mismatch of decoder_buffer_delays between the first and second streams, further including the step of delaying the decoding time of the second stream to match said first buffer and second buffer delays of the respective first and second streams to be spliced at the splicing point and further including the step of adding replacement frames comprising video packets to said first stream, an amount of video null packets to transmit calculated according to:

$$\text{video\_null\_pkt} = ((N*\text{frame\_period}) - (\text{decoder\_buffer\_delay 2} - \text{decoder\_buffer\_delay 1}))/\text{periodicity\_of\_transport\_packet},$$

where N is the smallest integer that makes the result of the equation positive and represents the number of replacement frames to be inserted; and e) transmitting the second stream starting from the determined inpoint through said output transport stream.

2. The method according to claim 1, wherein the replacement frames comprise MPEG B- or P-frames having information causing the decoder to present a last presented picture.

3. A method for splicing two MPEG encoded digital video streams to provide a single decodable video stream for transport at an MPEG transport level, said decodable video stream comprising video frames for temporary storage at a receiver decode buffer, the method comprising the steps of:

a) determining a splice outpoint of a first stream and a splice inpoint of a second stream to establish a splice point for both streams; wherein each program stream comprises a video elementary stream and an associated audio elementary stream, said method including the steps of: inserting audio frames as part of the video null information, replacing all audio frames in the second stream that have a presentation timestamp (PTS) smaller than a presentation timestamp (PTS) of the first video frame of the second stream and replacing all audio frames in the first stream having a presentation timestamp greater than the presentation timestamp of the last video frame of the first stream;

b) for each said first stream and said second stream, calculating a decoder_buffer_delay characterized as a time period between the first byte of the video frame entering into the decoder buffer until it is removed from the buffer at a decoding time, said first stream having an associated first decoder_buffer_delay (decoder_buffer_delay 1) and said second stream having an associated second decoder_buffer_delay (decoder_buffer_delay 2) and said first decoder_buffer_delay is greater than said second decoder_buffer_delay;

c) transmitting the first stream up to the determined splice outpoint onto an output transport stream;

d) comparing said first buffer delay and second buffer delay to generate a buffer delay difference and adjusting the decoder buffer occupancy level according to said buffer delay difference, said adjusting including inserting video null packets between said first and second streams at the splice point, to precisely compensate any mismatch of decoder_buffer_delays between the first and second streams, further including the step of transmitting and multiplexing video null packets onto said output stream in order to match said first buffer and second buffer delays of the respective first and second streams to be spliced at the splicing point and determining a quantity of video null packets (video_null_pkt) to transmit as governed according to:

$$\text{video\_null\_pkt} = (\text{decoder\_buffer\_delay 1} - \text{decoder\_buffer\_delay 2})/\text{periodicity\_of\_transport packet}$$

wherein the video null packets are MPEG-2 transport packets, in the form comprising one of: IDLE packets, audio packets and packets with adaptation field only; and e) transmitting the second stream starting from the determined inpoint through said output transport stream.

4. The method according to claim 3, wherein said inserted audio frames have identical sampling frequency and bit rate characteristics of said audio frames of the second stream, said inserting step including insertion at a periodicity determined by:

$$\text{number\_of\_samples\_of\_audio\_frame}/\text{audio\_sampling\_frequency}.$$

5. The method according to claim 3, where said audio frames to be replaced are substituted by frames with identical sampling frequency and bit rate characteristics and having content for causing an audio decoder to generate silence when presented at the output.

6. A system for splicing two MPEG encoded digital video streams to provide a single decodable video stream for transport at an MPEG transport level, said decodable video stream comprising video frames for temporary storage at a receiver decoder buffer, said system comprising:

a) means for determining a splice outpoint of a first stream and a splice inpoint of a second stream to establish a splice point for both streams;

b) processor means for determining a decoder_buffer_delay characterized as a time period between a first byte of the video frame entering into the decoder buffer until it is removed from the buffer at a decoding time, said first stream having an associated first decoder_buffer_delay (decoder_buffer_delay 1) and said second stream having an associated second decoder_buffer_delay (decoder_buffer_delay 2), said processor means comparing from said first buffer delay and second buffer delay to generate a buffer delay difference, wherein said processing means determines a quantity of video null packets (video_null_pkt) and replacement frames to transmit on said output stream for delaying said decoding time of the second stream, an amount of video null packets to transmit calculated according to:

$$\text{video\_null\_pkt} = ((N*\text{frame\_period}) - (\text{decoder\_buffer\_delay 2} - \text{decoder\_buffer\_delay 1}))/\text{periodicity\_of\_transport\_packet},$$

where N is the smallest integer that makes the result of the equation positive and represents a number of replacement frames to be inserted onto said output stream; and a c) multiplexer device for transmitting the first stream up to the determined splice outpoint onto said MPEG-2 output transport stream and transmitting the second stream starting from the determined inpoint onto said output transport stream, wherein said multiplexer device further adjusting the decoder buffer occupancy level according to said buffer delay difference, said adjusting including inserting video null packets between said first and second streams at the splice point, to precisely compensate any mismatch of decoder_buffer_delays between the first and second streams wherein said multiplexer device further delays a decoding time of the second stream to adjust the decoder buffer occupancy level at the splice point when said first decoder_buffer_delay is less than said second decoder_buffer_delay.

7. A system for splicing two MPEG encoded digital video streams to provide a single decodable video stream for transport at an MPEG transport level, said decodable video stream comprising video frames for temporary storage at a receiver decoder buffer, said system comprising:

a) means for determining a splice outpoint of a first stream and a splice inpoint of a second stream to establish a splice point for both streams wherein each program stream comprises a video elementary stream and an associated audio elementary stream, said system further including a means for inserting audio frames as part of the video null information and a means for replacing all audio frames in the second stream that have a presentation timestamp (PTS) smaller than a presentation timestamp (PTS) of the first video frame of the second stream with replacement audio frames, said means further replacing all audio frames in the first stream having a presentation timestamp greater than the presentation timestamp of the last video frame of the first stream with replacement audio frames, wherein said replacement audio frames include content for causing an audio decoder to generate silence when presented at the output;

b) processor means for determining a decoder_buffer_delay characterized as a time period between a first byte of the video frame entering into the decoder buffer until it is removed from the buffer at a decoding time, said first stream having an associated first decoder_buffer_delay (decoder_buffer_delay 1) and said second stream having an associated second decoder_buffer_delay (decoder_buffer_delay 2), said processor means comparing from said first buffer delay and second buffer delay to generate a buffer delay difference; and, c) multiplexer device for transmitting the first stream up to the determined splice outpoint onto said MPEG-2 output transport stream and transmitting the second stream starting from the determined inpoint onto said output transport stream, wherein said multiplexer device further adjusting the decoder buffer occupancy level according to said buffer delay difference, said adjusting including inserting video null packets between said first and second streams at the splice point, to precisely compensate any mismatch of decoder_buffer_delays between the first and second streams.

* * * * *